United States Patent [19]
Nisbet

[11] 3,948,312
[45] Apr. 6, 1976

[54] VENTILATION AND/OR AIR TEMPERATURE CONTROL APPARATUS

[75] Inventor: Arthur Robert Nisbet, Ammanford, Wales

[73] Assignee: Delanair Limited, Barking, England

[22] Filed: May 29, 1974

[21] Appl. No.: 474,260

[30] Foreign Application Priority Data
Oct. 12, 1973 United Kingdom............... 47877/73
Mar. 4, 1974 Germany............................ 2410254
Mar. 4, 1974 Germany...................... 7407489[U]

[52] U.S. Cl................. 165/16; 237/12.3 B; 165/42
[51] Int. Cl.² ......................................... F25B 29/00
[58] Field of Search.................... 165/16, 23, 42–44; 237/12.3 B

[56] References Cited
UNITED STATES PATENTS

| | | | |
|---|---|---|---|
| 3,428,115 | 2/1969 | Caldwell............................. | 165/23 |
| 3,774,676 | 11/1973 | Franz.................................... | 165/23 |
| R27699 | 7/1973 | Weaver et al......................... | 165/23 |

Primary Examiner—Albert W. Davis, Jr.
Assistant Examiner—William C. Anderson

[57] ABSTRACT

Air conditioning apparatus for a vehicle interior has a manually adjusted electrical control circuit actuating a servomotor for driving a control camshaft to vary the temperature and direction of a ventilating airflow by operation of a number of flap valves in air passages of the apparatus that permit a controllable proportion of cooled air flowing through the apparatus to bypass heating means and that determine the proportions of the total flow that are directed to upper and lower discharge outlets respectively. The control circuit sets a nominal ventilation temperature that also determines the rate of airflow and its direction of discharge, and the circuit setting is automatically modified by the external temperature.

12 Claims, 4 Drawing Figures

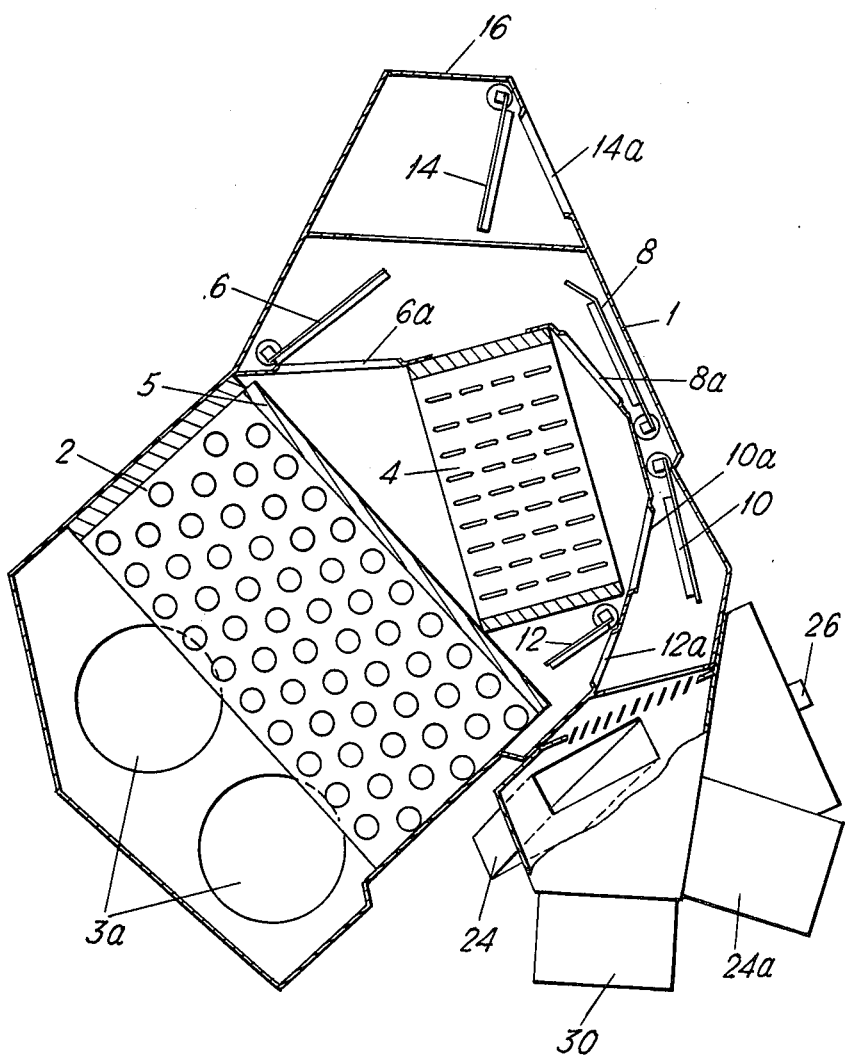

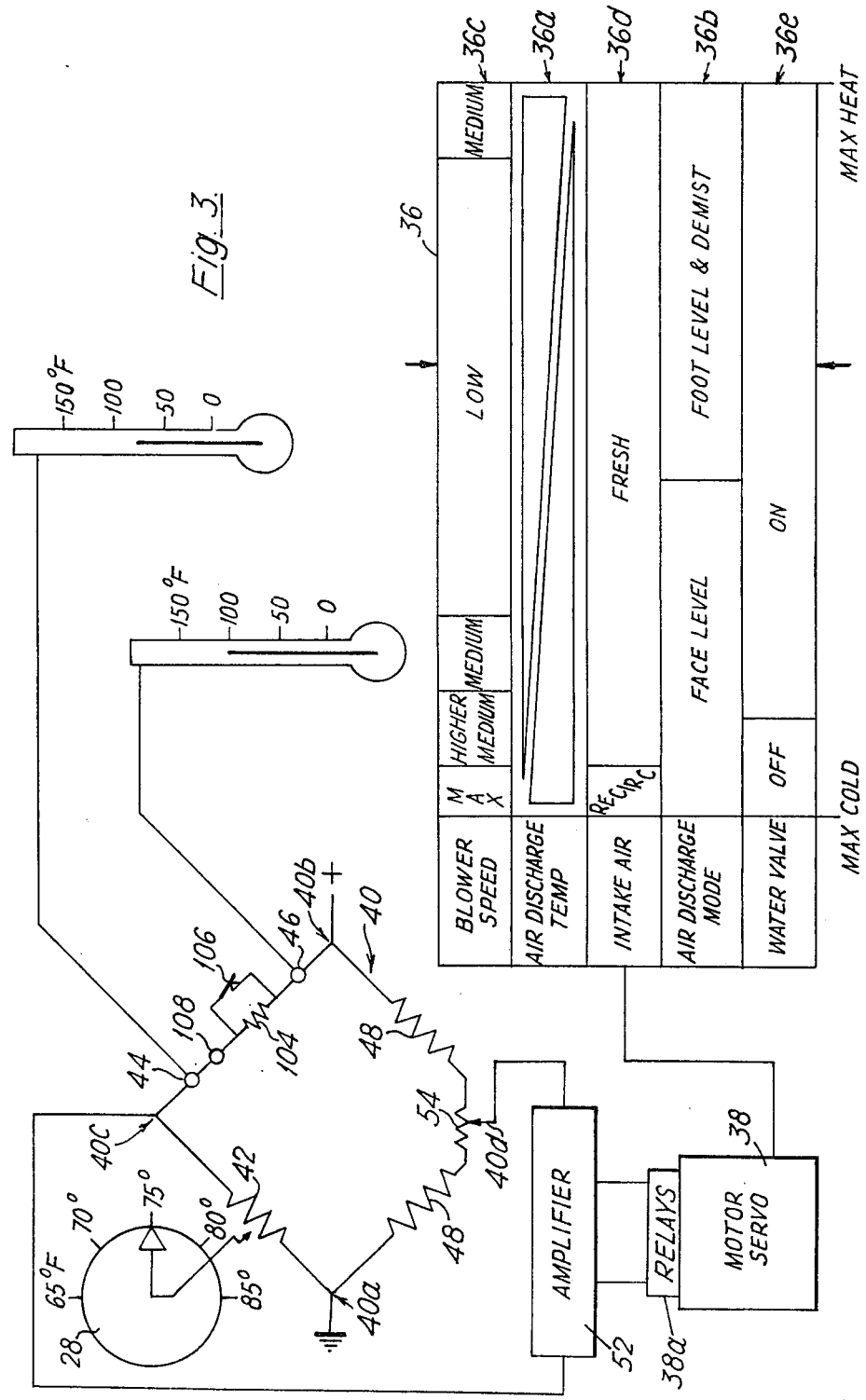

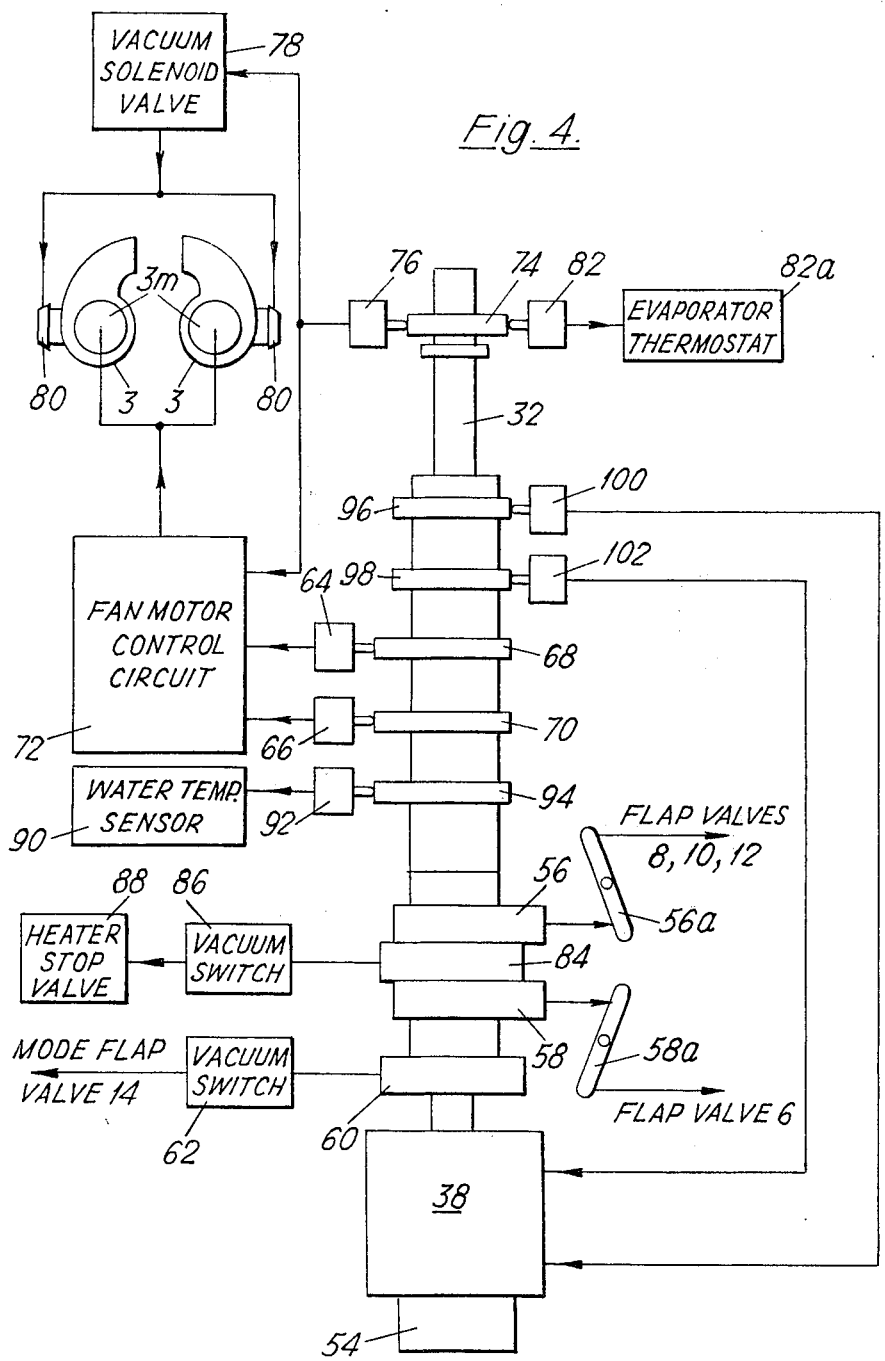

VENTILATION AND/OR AIR TEMPERATURE CONTROL APPARATUS

BACKGROUND OF THE INVENTION

This invention relates to apparatus for ventilation and temperature control of an enclosed space or compartment of a vehicle, such as the interior of a car or a lorry or truck.

The control of the many variable quantities that are involved in an air conditioning system requires complex and often bulky equipment. Considerations of space and weight are of importance in vehicles, as well as speed of response and, moreover, it is desirable that any air conditioning system in a vehicle should be capable of operating automatically if it is to be used to good effect without requiring continued attention that would distract the vehicle driver from his main task.

The present invention is concerned with apparatus that can be operated automatically and cater adequately for a wide variety of external factors while being of a relatively compact nature.

SUMMARY OF THE INVENTION

In air conditioning control apparatus according to the invention, there are provided control means for determining the operation or position state of a series of governing devices for governing ventilation and temperature regulation within an enclosed driving and/or passenger compartment of a vehicle, manually adjustable selector means being arranged to pre-set the control means in order to maintain a desired condition of ventilation and/or temperature control, said control means comprising a member having a series of control elements for said governing devices integral therewith or secured thereto, and electric servo means for actuating relative movement between said member and co-operating elements for said control elements, at least one of the governing devices being in the form of a valve that is adjustable to vary the relative proportions of two different temperature airstreams in an output airflow from the apparatus.

Preferably, said control member is in the form of a rotary shaft on which said control elements are provided as cams.

According to an advantageous feature of the invention, said control means comprise respective sensing elements that are responsive to the temperature within the compartment and to the ambient external temperature, said elements being arranged to co-act in such manner that at a given manually selected temperature value the apparatus maintains an internal temperature that varies inversely to the external temperature.

To modify further the temperature response of the apparatus, it is also possible to provide means that are responsive to the change between day and night conditions and that opeate to cause an increase of the temperature provided by said control means in said compartment with the changeover from day to night conditions.

In a preferred aspect of the invention, the apparatus is arranged to produce a higher rate of air flow at or near settings calling for maximum cooling or maximum heating of the compartment. Advantageously, respective outlets for the air flow to said compartment are provided at upper and lower levels and at least one of the governing devices is operable to vary the proportions of the air flow directed to the upper and lower levels respectively in dependence upon the temperature of the airflow, such that there is a greater flow to the lower level at higher air temperatures.

In a further preferred feature of the invention, a manual control device is provided to obtain defrosting of one or more lights or glazed surfaces enclosing the compartment, the control means being arranged to be operated by said device to override said temperature-sensing elements whereby hot air is obtained without reference to the prevailing temperature in the internal space, and said hot air is directed fully or mainly onto the lights or glazed surfaces.

BRIEF DESCRIPTION OF THE DRAWINGS

The invention will be more particularly described by way of example with reference to the accompanying drawings illustrating an air-conditioning apparatus for a car and wherein:

FIG. 2 is a longitudinal section of the apparatus in FIG. 1, FIG. 3 is a schematic illustration of the control means of the apparatus in FIGS. 1 and 2 and some of its functions, and, FIG. 4 illustrates the camshaft of the control means of FIG. 3 and its associated control elements.

DESCRIPTION OF A PREFERRED EMBODIMENT

Figure 1:
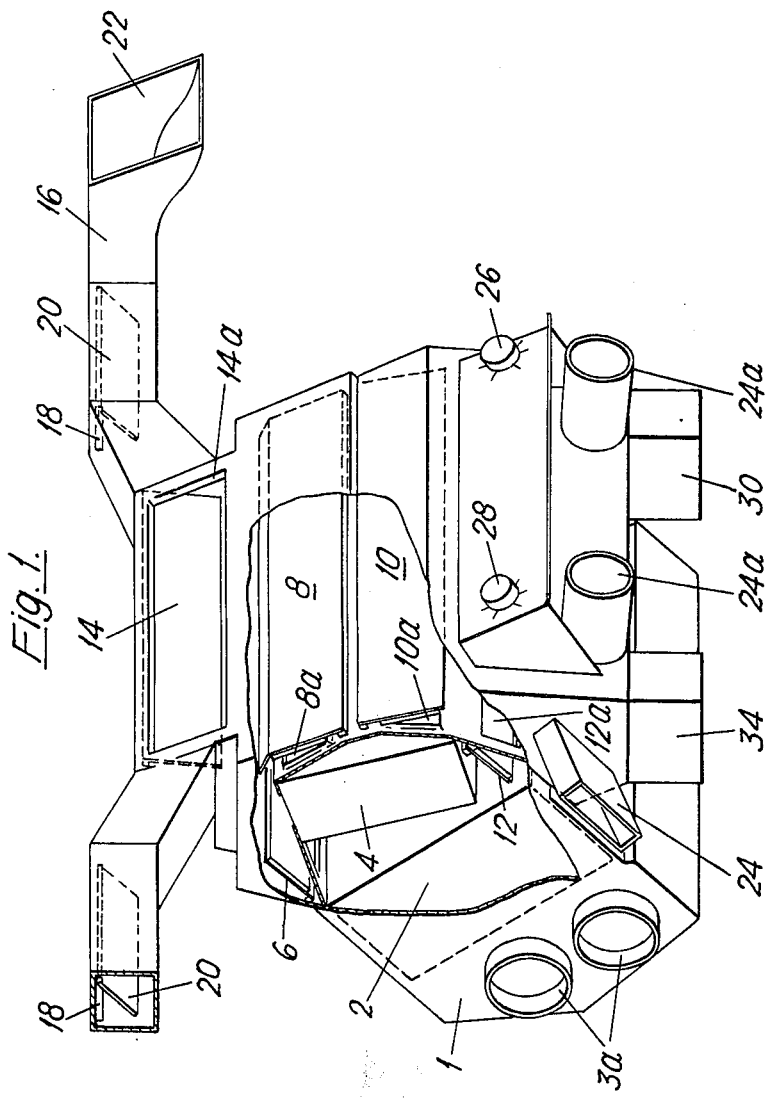
FIG. 1 is a perspective view from the rear of the air conditioning apparatus as installed in the central region of the dashboard or fascia in the driving compartment of a car.

Referring to the drawings, the air-conditioning apparatus comprises a casing 1 containing an evaporator 2 forming part of a refrigeration unit, e.g. operating on a vapour compression cycle, that is of generally known form and that therefore needs no detailed description or illustration. Air is blown by two fans 3 through entries 3a in the casing 1, to be cooled as it flows over the finned tubing of the evaporator. The cooled air leaves the evaporator through a condensate trap 5 beyond which a heater 4 is disposed within the casing 1. The heater is operated by any convenient means, such as the cooling water circuit of the vehicle engine, which like the refrigeration unit is of conventional design and is therefore not illustrated or described in detail.

Four governing flap valves 6, 8, 10 and 12 controlling the flow through respective internal ports 6a, 8a, 10a and 12a in the casing 1 are operable to vary the degree of heating of the discharge air between a maximum cold condition in which all the air bypasses the heater 4 (valves 6 and/or 12 being open and valves 8 and 10 being closed) and a maximum hot condition in which all the air from the evaporator flows through the heater (valves 6 and 12 being closed and valves 8 and/or 10 being open).

The distribution of the discharge air to an upper level, i.e., windscreen and face level, may be further controlled by a discharge mode flap valve 14 that can determine whether at least a main part of this discharge is to be directed onto the windscreen or towards the occupants of the vehicle. Thus, with the valve 14 closing off its opening 14a, air coming via the ports 6a and 8a flows through trunking 16 with outlets provided by screen vents 18, defrosting flap valves 20, and side fascia vents 22 (these last having manual closure means which are not shown). The valves 14 and 18 are automatically controllable as will be further described below. Discharge air directed by way of ports 10 and/or 12 in the lower part of the casing 1 to a lower region, i.e., foot level, can enter the passenger compartment through foot-well vents 24 at both sides of the central mounted casing to reach the driver and front-seat passenger. Further vents 24a from this region of the casing are connected to trucking (not shown) giving a direct supply of air at foot level to passengers in the rear of the compartment.

For the operation of the apparatus, a multi-position mode control knob 26 is provided that includes an "automatic" position in which a temperature value preset by a second knob 28 is maintained within the passenger compartment. This automatic mode of operation is governed by a servo control unit 30 comprising a control camshaft 32 and associated electrical and vacuum circuitry comprising an electrical control unit 34, and is capable of determining, in addition to the air discharge temperature, the rate of air flow and the direction or directions of the discharge.

The manner in which a number of features of this automatic control is exercised is illustrated by FIG. 3 where reference 36 indicates a diagrammatic representation of the control unit with the effects of rotation of the camshaft set out in a developed form to illustrate the functional programme it provides with respect to said rotation of the camshaft. It will be appreciated that while the arrangement represented, of static switches and rotary camshaft, is preferred, it would be possible alternatively to use displaceable switches operated by static cam elements, and/or other forms of relatively displaceable e.g. linearly displaceable, members.

With the knob 26 set at the "automatic" position, the operational state of the control unit for a given setting of the temperature control knob 28 is determined by a servomotor 38 that rotates the camshaft, the servo input being a function of temperature sensed within the passenger compartment relative to the setting of the knob 28, and the external ambient temperature provides a further controlling input. Electrical sensing is employed, a Wheatstone bridge circuit 40 having a potentiometer 42 in one arm that is adjusted by the knob 28, and another arm to which suitably located thermistors 44, 46 are connected in series to provide additive resistance values varying with the internal and external temperatures respectively (the latter conveniently being sensed in a fan intake of the apparatus). The two remaining arms of the bridge contain fixed resistances 48 and an input voltage is applied across the respective bridge junctions 40a and 40b between the potentiometer and one fixed resistance and between the thermistors and the other fixed resistance.

An error signal can thus be derived across the remaining junctions 40c, 40d of the bridge circuit when the selected internal temperature gives a potentiometer setting in imbalance with the thermistor resistances determined by the sensed temperatures, and the error signal is employed to control the air discharge temperature, amongst other parameters. The effect of the external temperature sensing thermistor 42 is to modify the sensed internal temperature at which the bridge is balanced. Thus, for a given temperature setting on the potentiometer 42, the error signal will be eliminated at an actual temperature that decreases slightly as external temperature increases. The temperature modification thus induced need not be extremely pronounced and the internal temperature sensing will normally have the predominant effect.

Any error signal from the bridge 40 is amplified in amplifier 52 and the amplified signal is employed to actuate relays 38a of the servo motor 38 which can rotate the camshaft between full cooling and full heating settings (i.e., the left-hand and right-hand limits of the representation 36 of the developed form of the rotary movement) that are the end limits of its movement. There is a second potentiometer 54 in the bridge circuit, at the junction between the two fixed resistances 48, its setting being adjusted by the servo motor 38 itself, this having a damping effect on the response of the servo loop in order to limit fluctuations in the discharge air temperature. The setting of the potentiometer 54 will vary with the difference between internal selected temperature and external ambient temperature. This is preferably arranged to reinforce the action of the external sensing thermistor 46.

With regard to the control unit camshaft 32, and its function as represented in the programme 36 in FIG. 3, cams 56, 58 act through direct mechanical linkages (indicated only schematically at 56a, 58a respectively) connecting them to the flap valves, 6, 8, 10, 12 to vary the positions of the valves between the maximum hot and maximum cold conditions referred to above in order to modify the proportion of the total air flow through the apparatus that passes through the heater 4. In this way the air discharge temperature (function 36a of the programme 36) is controlled. The linkage 56a displaces the flap valves 8, 10, 12 jointly, while the linkage 58a displaces only the flap valve 6. The arrangement is such that when the apparatus is at a low or moderate heating setting the combined air discharge from the valves 6, 8 to the upper discharge outlets is cooler than that from the valves 10, 12 to the lower outlets: this is found to avoid sensations of stuffiness for the occupants.

As already indicated, the mode flap valve 14 is located in the path of the air outlet flow from the upper exit of the casing 1 and its setting is controlled by the cam 60, by way of a vacuum control switch 62. With the apparatus under automatic operation, when the outlet opening 14a is closed by the valve 14 the upper level air discharge of air flows only through the relatively restricted exits provided by the demister screen vents 18 and the side fascia vents 22 (the defrosting flap valves 20 being operable only by overriding the automatic control). As function 36b of the programme 36 indicates, this setting of the valve 14 is associated with higher air discharge temperatures when the direction of the main flow away from the heads of the occupants can avoid stuffiness, as has already been mentioned.

When the valve 14 is opened, at lower heating settings, a relatively unrestricted flow is discharged through main, centrally positioned face level outlet 14a, so that when the apparatus is delivering cool air there is a greater flow to the occupants at face level, in contrast to the condition ruling when there is a high rate of heat output. It is possible to arrange the forms of the cams 56, 58 to prevent hunting of the mode flap valve 14 with small changes of temperature when the programme is operating around the changeover point of the valve.

As indicated by function 36c of the programme 36, there are four different rates of air throughput obtainable. In the absence of any other influence from the automatic control or override means, the lowest rate is operative when the apparatus is switched on and under the control of the camshaft 32 the two intermediate rates are brought into operation by micro switches 64, 66 acted on by cams 68 and 70 that regulate a common speed control circuit 72 for both fan motors 3m. As the functional programme in FIG. 3 indicates, over a considerable part of the range of adjustment the cams 68, 70 allow the fans to run at low speed. The first intermediate speed is used at a maximum hot air setting while at colder air settings the first intermediate speed and then the second, higher intermediate speed are brought successively into operation.

At the maximum cold setting the fan speed is increased further to a maximum by a cam 74. This comprises two lobes, one of which operates a micro switch 76 that acts on the control circuit 72 to increase the fan speed and simultaneously actuates a solenoid-operated vacuum switch 78 controlling vacuum-operated flap valves 80 to cause the fans to recirculate the internal air instead of drawing in fresh air from the exterior (function 36d of the programme 36). The second lobe of the cam 74 operates an override switch 82 for a thermostat 82a of the evaporator. The thermostat normally operates to prevent icing in the evaporator 2 but since that condition can be expected not to occur with the throughflow at the maximum cold setting, it is then shunted by the override switch 82. It may also be mentioned here that selection of the maximum cold setting causes cam 84 to operate a vacuum switch 86 that acts on a vacuum-operated valve 88 to shut off the flow of hot water through the heater 4 (function 36e of the programme 36).

When starting with a cold engine, the apparatus is normally not allowed to operate until a temperature sensor 90 in the engine cooling water system indicates that water is available at a temperature that will produce warm air. At colder settings of the control camshaft, this sensor is overriden by a micro switch 92 operated by a cam 94.

There are also two end limit cams 96, 98 which operate respective micro switches 100, 102 in circuit with the servo motor 38 to prevent further movement of the camshaft by the servomotor past maximum cooling and maximum heating settings respectively.

The mode control knob 26, in addition to its "automatic" position, bringing the above-described control mechanism into operation, has an "off" position which renders the apparatus inoperative and at the same time acts to close off the air entries to the fans from the exterior to prevent outside air entering through the apparatus when it is switched off. Respective "high-speed" and "low-speed" override positions of the knob 26 bring into circuit control connections (not shown) to the speed control circuit 72 to cause the apparatus to operate in the automatic mode, as described above, under the control of the servo-driven camshaft, but with the camshaft controls of the fan motor control circuit overriden, so that the apparatus operates at the chosen fan speed independently of the settings of the switches 64, 66 and 76: this allows, for example, the fans to be run at the highest speed when the apparatus is operating in a heating mode.

The control knob 26 also has a "defrost" position in which an additional resistor 104 is switched into the bridge circuit 40 by opening of contact 106, to ensure that the camshaft moves to a maximum heating setting and in which the flap valves 6, 8, 10, 12 are positioned to direct the greater part of the flow to the trunking 16, in particular the flap valve 10 being closed, but with the mode flap valve 14 closed and with the defrosting flap valves 20 open so that the heated air discharge is concentrated on the windscreen, and possibly by similar measures onto other glazed surfaces such as the rear window.

The apparatus described above is capable of modification in many ways. In particular, it is possible to vary the fan speed in a continuous manner, rather than have a number of fixed settings, for example using a variable resistance or an electronic control circuit 72, and the thermistors in the bridge circuit can have their functioning modified by resistors to give the desired subjective effect and inverse temperature relationship. It may also be desired to include means whereby the operation of the apparatus is modified in dependence upon the change between day and night conditions, in order to take account of the subjective sensation of relative coldness after sunset. This can be done by providing a modifying control element 108 in the bridge circuit to cause a slight rise of internal temperature after sunset. This element may comprise an optical sensor responding to the change between lightness and dark or may be a resistive element controlled by switching on the vehicle's running lights.

What I claim and desire to secure by letters patent is:

1. Air conditioning control apparatus for a vehicle having an enclosed driving and/or passenger compartment, the apparatus comprising, in combination, air flow conduit means, a cooling device positioned in said means, a heating device downstream of said cooling device in said means, a series of governing devices for regulating the air flow to govern ventilation and temperature within the compartment, control means for determining the operation or position state of said devices, manually adjustable selector means connected to the control means for presetting the control means to maintain a desired condition of ventilation and/or temperature control, said control means comprising a series of control elements for said governing devices, a series of co-operating elements for said control elements, and a control member having said series of control elements fixed thereto, servo means for actuating relative movement between said member and said co-operating elements whereby to control the state of the governing devices, said governing devices comprising valves in the air flow conduit means that are adjustable to vary the relative proportions of the heated and unheated airstreams in respective airflows directed through said outlets to the upper and lower levels respectively in dependence upon the setting of the control means, such that when the compartment is to be heated the upper level discharge temperature is less than the lower level discharge temperature by permitting an adjustable part of the flow from the cooling device to bypass said heating device for the respective flows to said upper and lower levels.

2. Apparatus according to claim 1 further comprising means responsive to the change between day and night conditions for operation to cause an increase of the temperature provided by said control means in said compartment with the changeover from day to night conditions.

3. Apparatus according to claim 1 further comprising cooling means and means for directing air into said output airflow by way of said cooling means, at least a further one of said governing devices being in the form of a valve operable by said control means to recirculate the air from said compartment through the cooling means at manual settings calling for maximum cooling rates.

4. Apparatus according to claim 1 having a hot water heating device for heating the airflow and said governing devices comprise shut-off means for the flow through said heating device when the apparatus is adjusted to a setting calling for maximum cooling of said compartment.

5. Apparatus according to claim 1 wherein said control means comprises an electrical bridge circuit, an element in said circuit being adjustable by said manually adjustable selector means, and a further element of said circuit is adjustable by the electric servo means to act as a servo loop feedback.

6. Apparatus according to claim 1, having respective outlets for the airflow to said compartment at upper and lower levels and said control means causes the valves to vary the proportions of the airflow directed through said outlets to the upper and lower levels respectively in dependence upon the temperature of the discharge airflow such that there is a greater flow to the lower level at higher air temperatures.

7. Apparatus according to claim 6, wherein the upper outlet means comprises a plurality of upper level air outlets and a further valve is disposed in the upper airflow directing means downstream of the heating device, said valve being operable by at least one of said control elements to vary the proportions of the airflows passing through the alternative upper level outlets.

8. Apparatus according to claim 6, wherein upper and lower air flow directing means are provided for directing the air flow from said cooling and heating means to said respective outlets, said governing devices including first and second pluralities of valves in said conduit means for controlling the air flow to the upper and lower level outlet means respectively, each said plurality of valves comprising a bypass valve operable to permit air flow from said cooling means to bypass said heating means, a further valve being provided operable so as to permit an air flow through said heating means, the said respective upper and lower air flow directing means permitting mixing of the flow from said heating means and the bypass flow from said cooling means between each plurality of valves and their respective outlets, the arrangement being such that said control member varies the states of the valves in a manner that causes a higher temperature air flow from the lower outlet means than from the upper outlet means when said selector means is adjusted to provide a heating air flow to said compartment.

9. Apparatus according to claim 8, wherein said control member is in the form of a rotary shaft on which the control elements for said pluralities of valves are provided as cams.

10. Apparatus according to claim 8 wherein said control means comprise respective sensing elements that are responsive to the temperature within said compartment and to the ambient external temperature, said elements being arranged for co-action to determine jointly the state of at least one of said devices in such manner that at a given manually selected temperature value the apparatus maintains an internal temperature that varies inversely to the external temperature.

11. Apparatus according to claim 10 wherein said control means further comprises override means co-operating with said sensing elements for determining the provision of a supply of heated air to the compartment independently of the condition of said sensing elements.

12. Apparatus according to claim 8 further comprising multi-speed fan means for said airflow and the control elements comprise elements in operative relation thereto for producing a higher rate of air flow at or near manual settings calling for maximum cooling or maximum heating of said compartment.

* * * * *